(12) United States Patent
Elenes et al.

(10) Patent No.: US 11,790,044 B2
(45) Date of Patent: Oct. 17, 2023

(54) DETECTING ANOMALOUS EVENTS IN A DISCRIMINATOR OF AN EMBEDDED DEVICE

(71) Applicant: Silicon Laboratories Inc., Austin, TX (US)

(72) Inventors: Javier Elenes, Austin, TX (US); Antonio Torrini, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/847,408

(22) Filed: Jun. 23, 2022

(65) Prior Publication Data

US 2022/0335260 A1 Oct. 20, 2022

Related U.S. Application Data

(62) Division of application No. 17/089,193, filed on Nov. 4, 2020, now Pat. No. 11,403,496.

(51) Int. Cl.
| | |
|---|---|
| *G06F 18/21* | (2023.01) |
| *G06N 3/088* | (2023.01) |
| *G06F 18/25* | (2023.01) |
| *G06F 18/20* | (2023.01) |
| *G06F 18/214* | (2023.01) |

(52) U.S. Cl.
CPC ...... *G06F 18/2193* (2023.01); *G06F 18/2148* (2023.01); *G06F 18/251* (2023.01); *G06F 18/285* (2023.01); *G06N 3/088* (2013.01)

(58) Field of Classification Search
CPC ............. G06F 18/2193; G06F 18/2148; G06F 18/251; G06F 18/285; G06N 3/088
See application file for complete search history.

(56) References Cited

U.S. PATENT DOCUMENTS

| | | | |
|---|---|---|---|
| 2016/0148057 A1* | 5/2016 | Oh ........................ | H04R 29/005 348/143 |
| 2019/0072959 A1* | 3/2019 | Palanisamy .............. | G06N 3/04 |
| 2019/0124469 A1* | 4/2019 | Roy ........................ | A61B 5/1117 |
| 2019/0228397 A1 | 7/2019 | Madden | |

(Continued)

FOREIGN PATENT DOCUMENTS

| | | | |
|---|---|---|---|
| JP | 5549802 B2 * | 7/2014 | |
| WO | 2020100136 | 5/2020 | |

OTHER PUBLICATIONS

Stanford EDU, Unsupervised Feature Learning and Deep Learning Tutorial, "Autoencoders," Aug. 9, 2020, 5 pages total, ufldl.stanford.edu/tutorial/unsupervised/Autoencoders.

(Continued)

*Primary Examiner* — Casey L Kretzer
(74) *Attorney, Agent, or Firm* — Trop, Pruner & Hu, P.C.

(57) ABSTRACT

In an embodiment, an apparatus includes: a sensor to sense real world information; a digitizer coupled to the sensor to digitize the real world information into digitized information; a signal processor coupled to the digitizer to process the digitized information into an image; a discriminator coupled to the signal processor to determine, based at least in part on the image, whether the real world information comprises an anomaly, where the discriminator is trained via a generative adversarial network; and a controller coupled to the discriminator.

17 Claims, 7 Drawing Sheets

(56) References Cited

U.S. PATENT DOCUMENTS

| | | |
|---|---|---|
| 2021/0029147 A1* | 1/2021 | McCanty ............ H04L 63/1425 |
| 2021/0103822 A1 | 4/2021 | Hegde |
| 2021/0125323 A1* | 4/2021 | Kim ..................... G06T 7/0004 |
| 2021/0358115 A1 | 11/2021 | Hever |
| 2021/0410003 A1 | 12/2021 | Shorty |
| 2022/0082598 A1 | 3/2022 | Torrini |
| 2022/0222929 A1* | 7/2022 | Gauerhof ............... G06N 3/047 |

OTHER PUBLICATIONS

Wikipedia, "Autoencoder," Aug. 9, 2020, 13 pages total.
Ian J. Goodfellow, et al., "Generative Adversarial Nets," Jun. 10, 2014, 9 pages total.
Kim, Test Case Generation for Convolutional Neural Network, (published in International Journal of Computing and Digital Systems, vol. 9, No. 2, pp. 271-280, Mar. 2020.

* cited by examiner

DETECTING ANOMALOUS EVENTS IN A DISCRIMINATOR OF AN EMBEDDED DEVICE

CROSS-REFERENCE TO RELATED APPLICATIONS

The present application is a divisional of U.S. patent application Ser. No. 17/089,193, filed on Nov. 4, 2020, the content of which is hereby incorporated by reference.

BACKGROUND

Anomalies are patterns in data that do not conform to a well-defined notion of normal behavior. Deep neural networks can be trained to detect anomalies in data patterns. However training such a network requires a large amount of data. As an example, a training set may require on the order of thousands of different samples. Abnormal (positive) cases are much rarer than normal (negative) cases, therefore data tends to be heavily skewed towards negative cases. Moreover this large amount of data needs to be labeled by human experts. It is time consuming and expensive to collect large amounts of labeled data that is representative of positive and negative real-world examples.

SUMMARY OF THE INVENTION

In one aspect, an apparatus includes: a sensor to sense real world information; a digitizer coupled to the sensor to digitize the real world information into digitized information; a signal processor coupled to the digitizer to process the digitized information into an image; a discriminator coupled to the signal processor to determine, based at least in part on the image, whether the real world information comprises an anomaly, where the discriminator is trained via a generative adversarial network; and a controller coupled to the discriminator. In response to an indication of the anomaly from the discriminator, the controller is to trigger an action.

In an example, the image may be a spectrogram. The discriminator may be a binary classifier to output a probability value, where when the probability value exceeds a threshold the anomaly is detected and when the probability value does not exceed the threshold no anomaly is detected. The discriminator can be trained with samples of a positive condition comprising the anomaly, the samples of the anomaly comprising synthetic samples generated by a generator of the generative adversarial network and real samples of the anomaly. The trained discriminator is to determine whether the real world information comprises the positive condition comprising at least one of a glass break sound, a gunshot sound, a baby cry, a falling body, and an emergency siren. In an example, the generator is to generate the synthetic samples including at least some synthetic glass break sounds and at least some synthetic gunshot sounds. The apparatus may further include a non-volatile storage comprising a plurality of binary classifiers, each associated with a given anomaly. The discriminator may output a probability metric comprising the indication of the anomaly. The controller may receive the probability metric, and in response to the probability metric exceeding a threshold, trigger the action comprising a wireless communication of an alert to a remote location.

In another aspect, a method includes: generating, in a generator of a GAN, a first plurality of random vectors of a latent space; generating, in the generator, a first plurality of random images using the first plurality of random vectors; forming a training set including a mixture of the first plurality of random images and a first plurality of real images comprising one or more anomalous conditions; training a discriminator of the GAN with the training set; and storing the trained discriminator in a non-transitory storage medium.

In an example, the method further comprises determining whether the GAN is sufficiently trained. The method may further comprise determining whether the GAN is sufficiently trained based at least in part on a first loss function associated with the discriminator and a second loss function associated with the GAN. The method further may include: generating, in the generator, a second plurality of random vectors of the latent space; generating, in the generator, a second plurality of random images using the second plurality of random vectors, and identifying the second plurality of random images as real images; and providing the second plurality of random images with the identification as the real images to the discriminator and training the generator based at least in part on discriminator decisions for the second plurality of random images.

In an example, the method further may include locking a plurality of weights of the discriminator prior to providing the second plurality of random images to the discriminator. The method also may comprise obtaining the first plurality of real images from a plurality of anomalous real world samples comprising audio information of the one or more anomalous conditions. The trained discriminator may be sent to one or more end node devices to enable the one or more end node devices to identify the one or more anomalous conditions in real world information received in the one or more end node devices.

In another aspect, a system comprises a processor and a non-transitory storage medium coupled to the processor. The non-transitory storage medium may include instructions that when executed cause the processor to: receive, in a generator of a GAN, a first plurality of random vectors of a latent space; generate, in the generator, a first plurality of random images using the first plurality of random vectors; form a training set including a mixture of the first plurality of random images and a first plurality of real images comprising one or more anomalous conditions; train a discriminator of the GAN with the training set; and store the trained discriminator in a non-volatile storage.

In an example, the non-transitory storage medium further comprises instructions that when executed cause the processor to determine whether the GAN is sufficiently trained. The non-transitory storage medium further may include instructions that when executed cause the processor to determine whether the GAN is sufficiently trained based at least in part on a first loss function associated with the discriminator and a second loss function associated with the GAN. The non-transitory storage medium further may include instructions that when executed cause the processor to: lock a plurality of weights of the discriminator; receive, in the generator, a second plurality of random vectors of the latent space; generate, in the generator, a second plurality of random images using the second plurality of random vectors, and identify the second plurality of random images as real images; and provide the second plurality of random images with the identification as the real images to the discriminator and train the generator based at least in part on discriminator decisions for the second plurality of random images.

DETAILED DESCRIPTION

In various embodiments, anomaly detection may be performed using a discriminator trained in a Generative Adversarial Network (GAN). In this GAN, either normal behavior or abnormal behavior is modeled using an adversarial training process. During inference, the discriminator network is used to detect whether new data conforms to the trained behavior. Since only one type of behavior is used in training no labels are required, such that an unsupervised classifier results. In some cases it is practical to train on normal behavior (for example accelerometer data on normally operating electric motors) and in other cases it is more practical to train on abnormal behavior (for example the sound of glass breaking).

With an embodiment, a resulting trained discriminator network is less cumbersome to deploy in the field than other networks used for anomaly detection. For example it is less complex than an autoencoder, which requires an encoder network and a decoder network. This discriminator may also be less complex than a bidirectional GAN, as the discriminator is based on a simple GAN architecture having a generator and a discriminator. Only the discriminator is used during inference, where the discriminator can be trained on negative examples (normal behavior) or positive examples (abnormal behavior).

Figure 1:
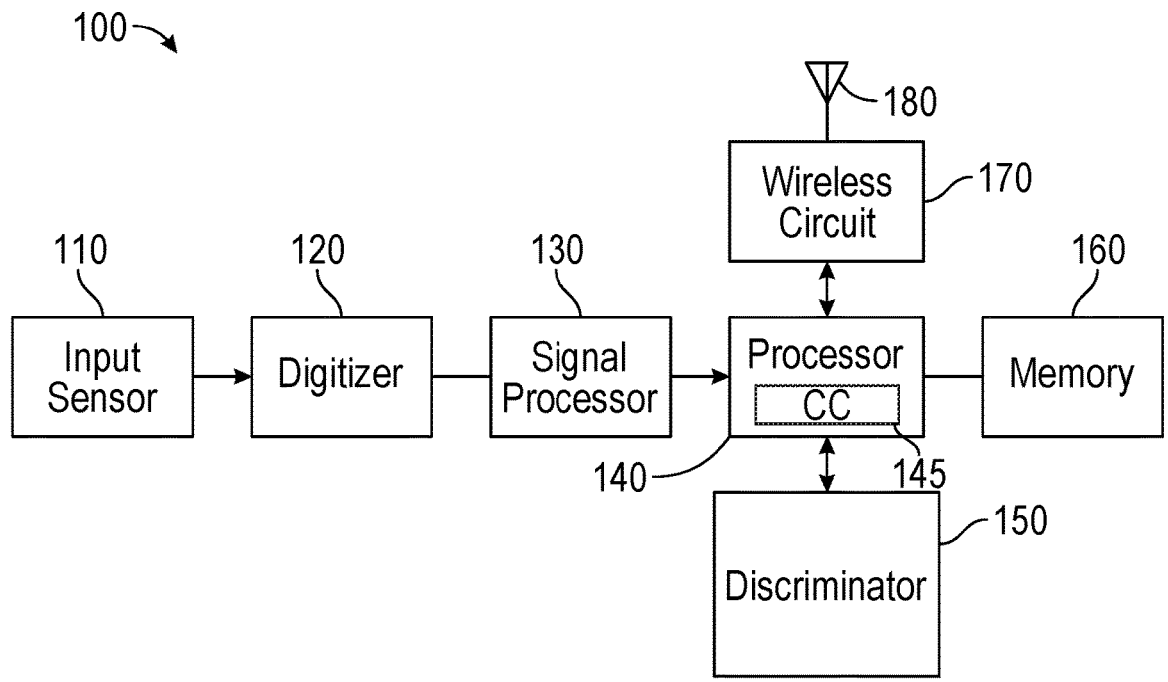
FIG. 1 is a block diagram of an end node device in accordance with an embodiment.

Referring now to FIG. 1, shown is a block diagram of an end node device in accordance with an embodiment. As shown in FIG. 1, device 100 may be any type of end node device such as an Internet of Things (IoT) device. In some cases, device 100 may be a sensor, actuator, or any other type of small wireless enabled device. In the high level shown in FIG. 1, device 100 includes an input sensor 110. Understand that in different implementations multiple sensors may be present, each to sense a different type of real world information such as environmental condition, image information, speech or other audio information or so forth. Input sensor 110 thus may include one or more microphones and possibly other sensors such as image sensors, video sensors, thermal sensors, accelerometers, passive infrared sensors and so forth.

In turn, input sensor 110 is coupled to a digitizer 120, e.g., an analog-to-digital converter (ADC), which digitizes the information and provides it to a signal processor 130, which may perform various signal processing, such as filtering, amplification or so forth. Note that in some implementations, at least some of this signal processing may be performed in an analog domain prior to digitizer 120. In any event, the digitized processed information is provided to a processor 140, which may be a main processor of system of device 100, such as a microcontroller, processing core or other general-purpose processing circuitry or other such controller.

Relevant to the discussion herein, processor 140 may perform additional signal processing on this information, including converting the digitized information into an image such as a spectrogram. In turn, processor 140 is coupled to a discriminator 150 which in some cases may be implemented as a dedicated hardware circuit. In other cases, discriminator 150 is implemented in firmware and/or software. In different embodiments, discriminator 150 can be implemented as a binary classifier to classify an input. Here in the context of a spectrogram, the input can be classified as one of two classes. In some implementations, rather than a strict binary output, e.g., positive or negative with respect to a class of interest, discriminator 150 may output a confidence value, e.g., a percentage of likelihood as to whether the received input (e.g., spectrogram) is of the relevant class. As will be described herein, discriminator 150 may be trained in a GAN such that a highly trained binary classifier is realized. More specifically, this binary classifier is trained to distinguish whether new data conforms to the behavior it has been trained for (normal or abnormal). Note that in some cases at least two of signal processor 130, processor 140 and discriminator 150 may be implemented together.

In some cases, processor 140 may be configured to trigger some action based on the classification decision from discriminator 150. To this end processor 140 may include a control circuit 145 configured to trigger an action based on a classification decision received from discriminator 150. For example, in the context where an incoming sample is identified as an anomalous event, e.g., a gunshot, glass break or so forth, processor 140 may cause the triggering of an alarm condition. This alarm condition may cause device 100 to take some action. In other cases, this alarm condition may be communicated, e.g., wirelessly from end node device 100 to a main controller of a system such as a security system or so forth.

In the case where an identification of an anomalous event is to be communicated to a remote destination, processor 140 may receive the decision from discriminator 150 and provide it to a wireless circuit 170, which may wirelessly transmit the compressed information via an antenna 180. Understand that antenna 180 also may be configured to receive incoming information, such as command information from the cloud-based destination to enable device 100 to perform some action in response to the command information received. Although shown at this high level in the embodiment of FIG. 1, many variations and alternatives are possible. For example in other cases a device 100 may communicate via a wired connection.

Figure 2:
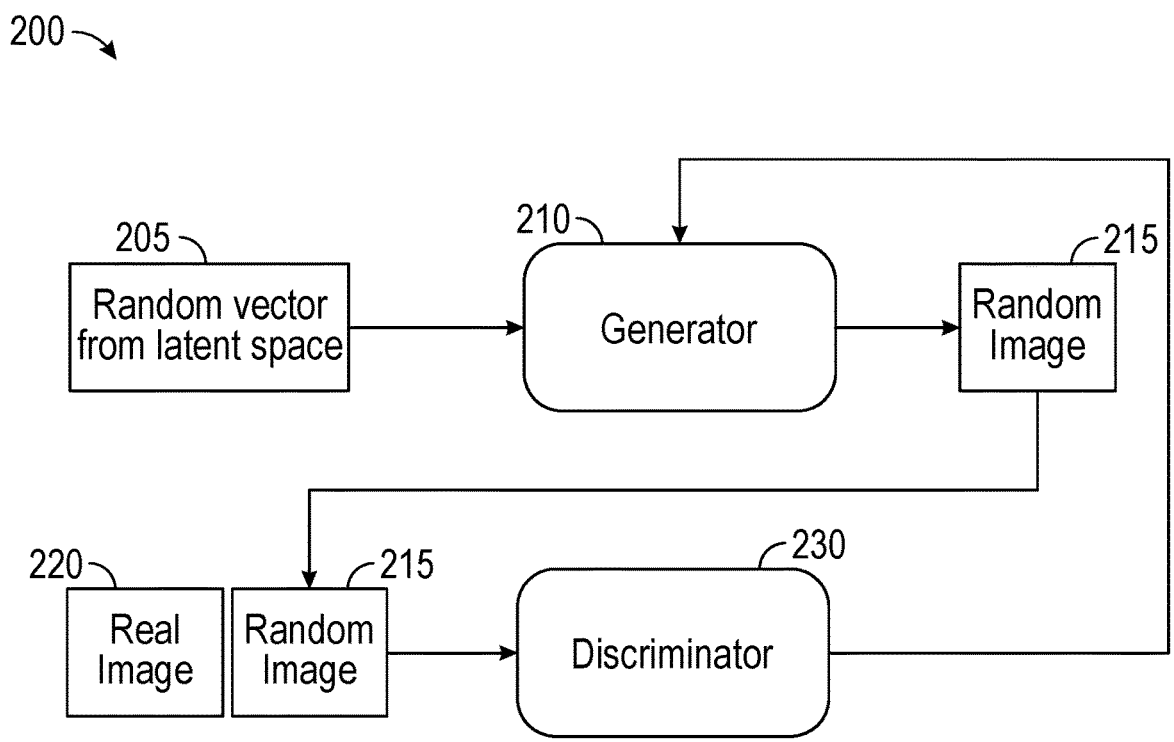
FIG. 2 is a block diagram of a GAN in accordance with an embodiment.

Referring now to FIG. 2, shown is a block diagram of a GAN in accordance with an embodiment. In an embodiment, GAN 200 may be implemented in one or more server computers such as cloud-based servers. As shown in FIG. 2, GAN 200 includes a generator 210 and a discriminator 230. With the arrangement in FIG. 2, generator 210 may generate images. More specifically, generator 210 takes as input a random vector 205 (vector in latent space) and generates a synthetic image that resembles a real data pattern. These sample vectors in the latent space may be obtained using a Gaussian distribution (vs. a uniform distribution). These synthetic (e.g., random) or so-called "fake" images are based, at least in part, on random vectors 205, which may be obtained from a latent space. Accordingly, generator 210 outputs synthetic images (representative image 215 is shown). Next, such synthetic images may be combined with a training set formed of real images (at block 220). This combination of images including both real and synthetic images is provided to discriminator 230.

In embodiments, discriminator 230 is a binary classifier that is trained to classify input images as either real or fake. More specifically, discriminator 230 may be configured to take an input image (real or synthetic) and predict whether the image came from a training set (real image) or was created by generator 210. Discriminator 230 may be configured as a given type of neural network having a plurality of layers, which can be implemented with convolutional layers or fully connected layers. In an embodiment, discriminator 230 is trained to distinguish between fake samples (i.e., generated) or real samples (from the training data set). The discriminator is a simple binary classifier that may be configured to output an estimated probability of its input belonging to the training data set. As seen, these classification decisions that are output from discriminator 230 are provided as training feedback to generator 210. As such, generator 210 operates such that it is trained to fool discriminator 230, evolving towards generating increasingly realistic images as training proceeds. Note that this training of discriminator 230 may be performed offline. In an example, discriminator training may be done in, e.g., 10's of minutes in one embodiment. Understand while shown at this high level in the embodiment of FIG. 2, a GAN may be implemented in other manners in other implementations.

Figure 3A:
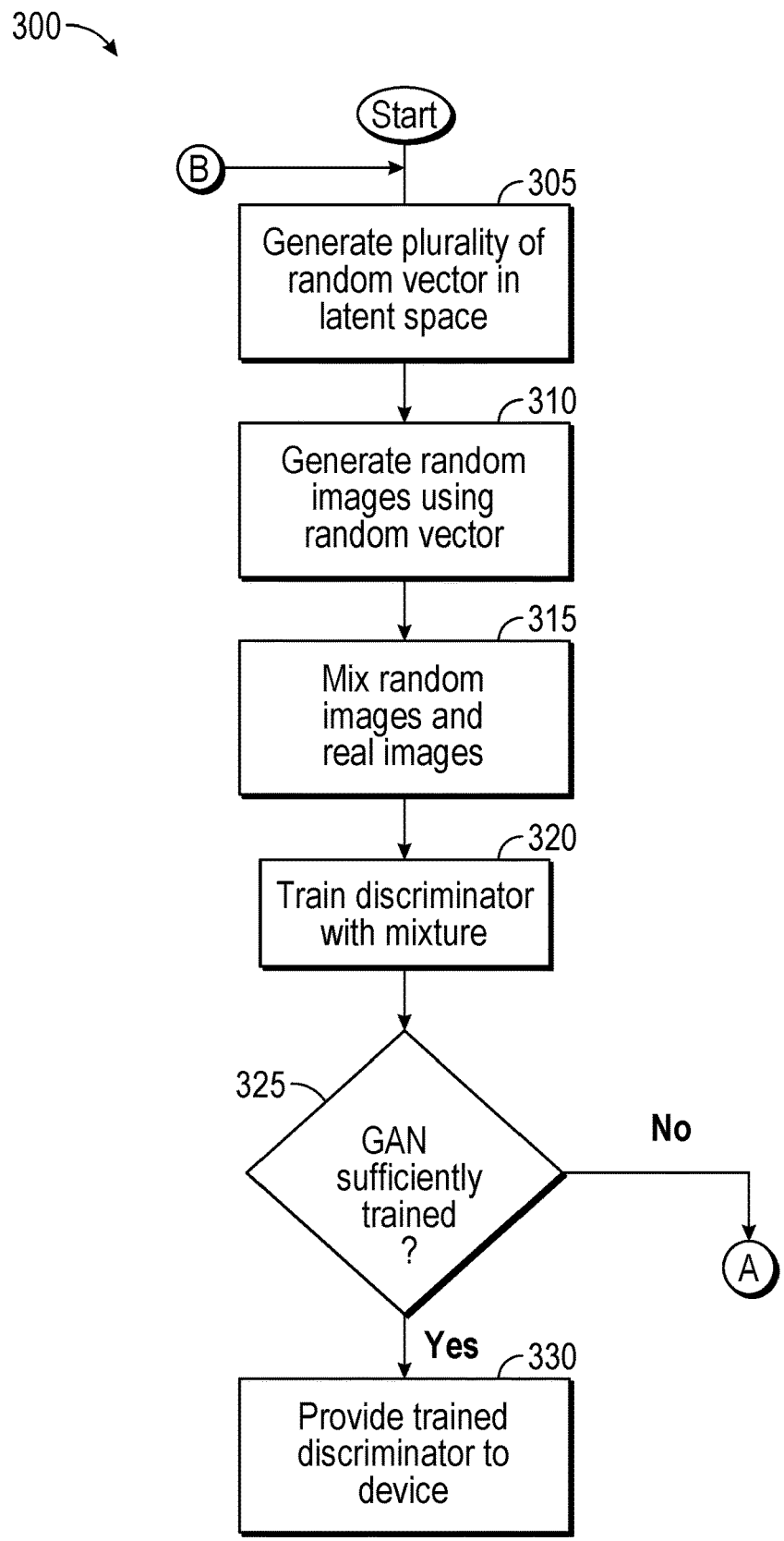
FIGS. 3A and 3B are flow diagrams of a method in accordance with an embodiment.
Figure 3B:
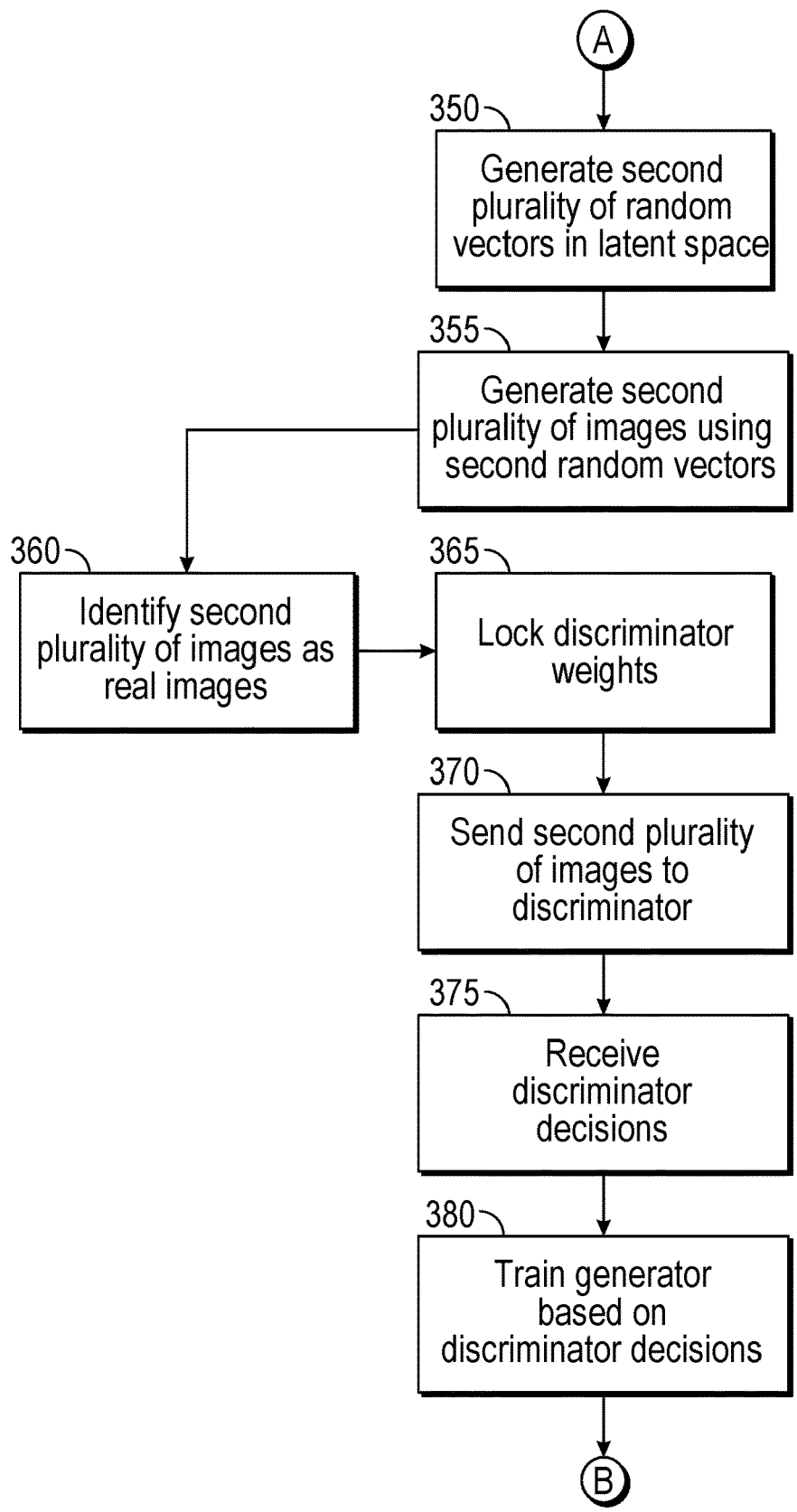

Referring now to FIGS. 3A and 3B, shown is a flow diagram of a method in accordance with an embodiment. More specifically, these flow diagrams illustrate a method for training a discriminator and generator of a GAN. In an embodiment, this training method may be performed by one or more computing systems, such as at least one cloud-based server. Of course a GAN may be implemented in other computing systems, which may equally perform the method herein.

As illustrated, method 300 begins by generating a plurality of random vectors in a latent space (block 305). Although embodiments are not limited in this regard, the number of random vectors may be in the thousands, in one example. From these random vectors, a plurality of random images may be generated (block 310). In an embodiment, a generator of the GAN may generate these random images. Note that while images are generated, these generated fake samples may be intended to replicate a given audio sample, such as the sound of breaking glass, a gunshot, a baby cry, a falling body, an emergency siren or so forth. As such, the random vectors are processed into image information, e.g., in the form of a spectrogram.

Next at block 315 these random images may be mixed with real images. Understand that the real images may be obtained from a training set for a given characteristic for which a discriminator is desired to be trained on. These real images may be image information generated from real world information, in this case real world audio samples, e.g., the sound of breaking glass, gunshot, a baby cry, a falling body, an emergency siren or any other real world input to be classified by a discriminator. As other examples, a discriminator may be configured to detect other environmental conditions such as image information, e.g., detecting presence of a person, a person having a gun or other restricted item such as detecting a weapon in an X-ray machine, detecting tumors in a magnetic resonance image (MRI), vibration information or so forth. Other examples may include presence detection using a passive infrared (PIR) detector.

To obtain real images from this real world information, a signal processor that receives the audio samples may generate corresponding spectrograms. In different embodiments, different numbers of real and synthetic images may be mixed together. However, for effective training, approximately equal numbers of real and synthetic images may be used in an embodiment.

Still referring to FIG. 3A, next at block 320 the discriminator of the GAN may be trained. More specifically, the mixture of real and random images may be used to train the discriminator. The real samples (from the training dataset) are labeled as "real" and the fake samples (generated by the generator) are labeled as "fake". In the context in which the discriminator is a binary classifier, as a matter of convention, the real images may be labeled with a value of logic 0 to indicate a real image and in turn, the random images may be labeled with a value of logic 1 to indicate a fake image. Note that these operations from blocks 305-320 may be repeated several times (epochs).

Next at diamond 325 it is determined whether the GAN has been sufficiently trained. In one embodiment, this determination may be based on analysis of at least one loss function for the discriminator and at least one loss function for the GAN. If it is determined that the GAN has been sufficiently trained, e.g., if the loss functions are below one or more thresholds, control passes to block 330. In an embodiment, the loss function for the discriminator is a binary cross-entropy. The other loss function is an adversarial loss of the GAN which is also a binary cross-entropy.

At block 330, the trained discriminator may be provided to a device. Understand that this device may be an end node device such as a given integrated circuit, IoT device or so forth. The discriminator may be provided to the device in different ways in different embodiments. For example, in cases in which the trained discriminator is generated prior to manufacture of an IC, firmware including this discriminator may be included within the IC as code stored in a non-volatile storage. In other cases, the discriminator may be provided by way of programming an IC, IoT or other such device, either directly or by storing code of the discriminator in a non-transitory storage medium that is accessible to the device. Understand of course that prior to this block 330, the trained discriminator may be stored in one or more non-volatile storage media of the server itself so that it can be maintained and provided to the various devices. Also understand that based on further testing, field reports or so forth, it is possible that the discriminator may be updated and/or additionally trained. After such additional training, an updated discriminator may be provided by way of patch code or as new code to take the place of existing discriminators by an in-field update.

Still with reference to FIG. 3A, instead if it is determined at diamond 325 that the GAN is not sufficiently trained, control passes to block 350 (of FIG. 3B). As illustrated here, a second plurality of random vectors may be generated in a latent space. The same number of random vectors generated as discussed above can be generated. Next at block 355, a second plurality of images, e.g., additional synthetic (e.g., random) images, may be generated using the second random vectors. Note that these second plurality of images are fake images. Yet at block 360 these second plurality of images may be identified as a real images, by applying a real-valued label to these images. Continuing with the above-described convention, these images may be labeled with a logic 0 value.

Note that training occurs in a staggered fashion, with iterations between discriminator training and generator training. To enable generator training to be performed using these images, first at block 365 the discriminator weights may be locked. Next at block 370 these second plurality of images are sent to the discriminator. Understand that even though the discriminator receives these images with a label that indicates that they are real, based on its earlier training the discriminator may output decisions to classify the images as anomalous or not anomalous. At block 375, the discriminator decisions are used to compute an adversarial loss function for the GAN network (i.e., the loss of the gan(x)=discriminator(generator(x)). The generator may perform training (at block 380) based on the adversarial loss. In the training, the generator may adapt weights in a direction that makes the discriminator more likely to classify a synthetic image as real, using the GAN or adversarial loss derived from the GAN outputs.

Embodiments may perform certain optimizations in training a GAN in accordance with an embodiment. To this end, it is noted that sparse gradients may hinder GAN training. According, max pooling may be replaced with a strided convolution. Also a leaky rectified linear unit (ReLu) may be used, which allows small negative values. In addition, randomness may be introduced during training. Further, dropout may be used in the discriminator. Further to improve training, random noise may be added to labels, and a tanh activation may be used in a last layer of the generator instead of a sigmoid. Of course, additional or different optimizations may be used in other embodiments.

Still with reference to FIGS. 3A and 3B, control passes back to block 305, discussed above, where additional discriminator training may occur. Such operation may proceed iteratively until it is determined at diamond 325 that the GAN is sufficiently trained, as described above. Completion of training may be achieved based at least in part on the discriminator and adversarial loss functions, to obtain a discriminator trained to detect anomalies. While shown at this high level in the embodiment of FIGS. 3A, 3B variations and alternatives are possible. Furthermore, understand that additional operations in performing training may occur. For example, some amount of noise may be added to the labels to improve training.

Table 1 below shows pseudo-code of an example training of a GAN in accordance with an embodiment.

TABLE 1

| 0 | start = 0 |
|---|---|
| 1 | for step in range(iterations): |
| 2 | random)_latent_vectors = np.random.normal(size=(batch_size, latent_dim)) |
| 3 | generated_images = generator.predict(random_latent_vectors) |
| 4 | stop = start + batch_size |
| 5 | real images = x_train[start: stop] |
| 6 | combined_images = np.concatenate([generated_images, real_images]) |
| 7 | labels = np.concatenate([np.ones((batch_size, 1)), np.zeros((batch size, 1))]) |
| 8 | labels += 0.05 * np.random.random(labels.shape) |
| 9 | d_loss = discriminator.train_on_batch(combined_images, labels) |
| 10 | random_latent_vectors = np.random.normal(size=(batch_size, latent dim)) |
| 11 | misleading targets = np.zeros((batch_size, 1)) |
| 12 | a_loss = gan.train_on_batch(random_latent_vectors, misleading_targets) |
| 13 | start += batch_size |

Note that in the above pseudo-code, line 9 establishes the discriminator loss as a binary cross-entropy equal to a function of the predicted output probability of the discriminator (i.e., cross-entropy=f(true label="fake/real"). And line 12 establishes the adversarial loss as a binary cross-entropy equal to a function of the predicted output probability of the GAN (i.e., f(true label="always real"). Of course, while shown with this example code, understand that different training techniques can be used in other embodiments.

Figure 4:
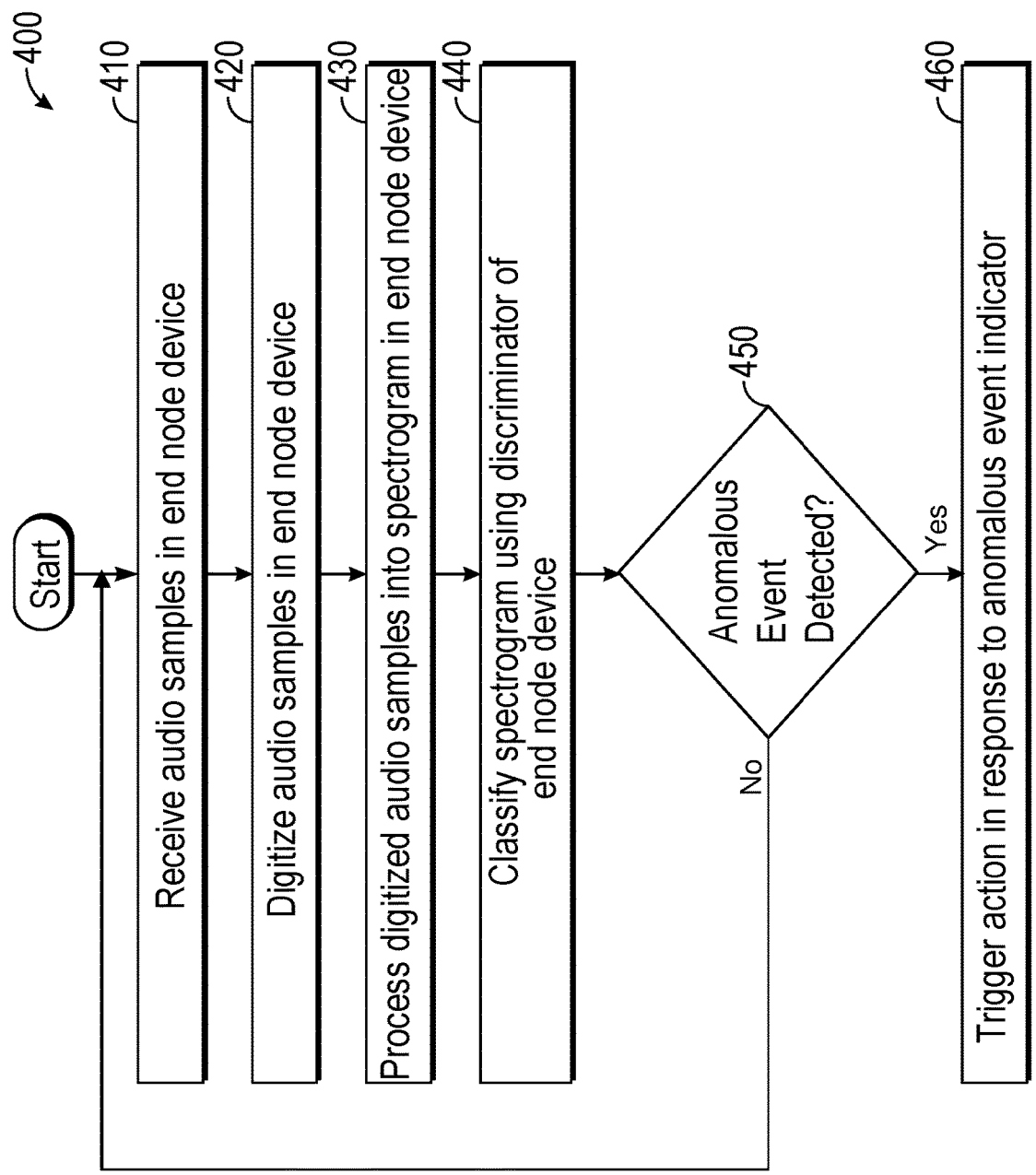
FIG. 4 is a flow diagram of a method in accordance with an embodiment.

Referring now to FIG. 4, shown is a flow diagram of a method in accordance with an embodiment. More specifically, method 400 is a method performed by an end node device to receive incoming real world information, and process and classify it using a trained discriminator in accordance with an embodiment. While for illustration FIG. 4 is in the context of the real world information being audio information, understand embodiments are not limited in this regard and in other implementations, the real world information may be of a wide variety of different information types.

As illustrated, method 400 begins by receiving audio samples in the end node device (block 410). For example, the end node device may include a microphone or other sensor to detect audio input, such as environmental noise present in a given environment, which can of course include a wide variety of different sounds. Note that in other cases, the input may be an input received from an image sensor. At block 420 these audio samples may be digitized, e.g., after certain analog front end processing such as filtering, signal conditioning and so forth. Next at block 430 the digitized audio samples may be processed. In embodiments, the samples may be processed into a spectrogram. Of course other digital representations of the audio sample may be generated in other implementations such as may be appropriate for other types of input information. For example, in another case a single fast Fourier transform (FFT) may be used for a time stationary signal.

Still with reference to FIG. 4, control next passes to block 440 where the spectrogram may be classified. More specifically, embodiments herein a discriminator may classify the spectrogram as one of two binary classes, e.g. positive or negative, normal or abnormal, expected or not expected. Assume an example of environmental sound, in which the discriminator is training for an anomalous event such as a glass break or a gunshot sound. In this example, at block 440 the discriminator may classify the spectrogram as an anomalous event. To this end, the discriminator may communicate an indication as a binary value for a representative classification and, in some cases, a confidence level of the classification. In some cases, the discriminator may output a probability value. And, when the probability value exceeds a threshold, the anomaly is detected (and vice versa).

Then it is determined (e.g., in a processor coupled to the discriminator) if the classification decision is an anomalous event (diamond 450). In the instance of a determination of the anomalous event, at block 460, a processor may trigger an action in response to this anomalous event indication. For example, the processor may be configured with logic to identify a particular type of anomalous event, e.g., based on the indication of the discriminator and the anomalous event indication and perform a given action. This logic may include a table including multiple entries. Each entry may be associated with a particular discriminator (in examples where there is more than one trained discriminator within an end node device, with each discriminator trained in a GAN with different data), the classification or confidence level (and possibly a threshold level for which the confidence level is to exceed) and the indicated action.

As one simple example, the indicated action may be for the processor to trigger an alert condition, e.g., sent in a message to a central controller of a given network. In different examples, this central controller may be in a local network such as a mesh network with the end node device.

In other cases, the end node device may communicate the alert condition to a cloud-based destination, e.g., a remote server for further handling. Understand while shown at this high level in the embodiment of FIG. 4, many variations and alternatives are possible.

Figure 5:
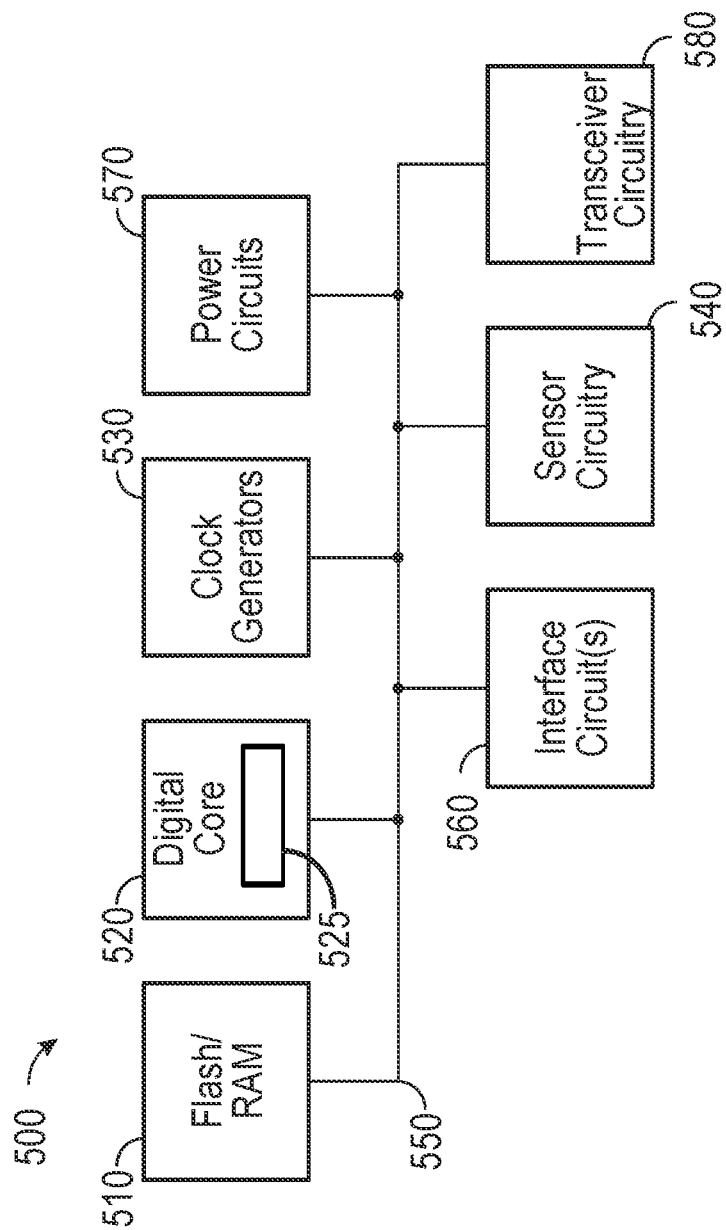
FIG. 5 is a block diagram of a representative device which may be incorporated into a wireless network as a node in accordance with an embodiment.

Embodiments may be implemented in many different types of end node devices. Referring now to FIG. 5, shown is a block diagram of a representative device 500 which may be incorporated into a wireless network as a node. And as described herein, device 500 may sense and detect an anomalous condition, e.g., based on processed spectrograms and communicate indication of the condition to a remote server, and in turn receive commands from the remote server. In the embodiment shown in FIG. 5, device 500 may be a sensor, actuator, controller or other device that can be used in a variety of use cases in a wireless control network, including sensing, metering, monitoring, embedded applications, communications applications and so forth.

In the embodiment shown, device 500 includes a memory system 510 which in an embodiment may include a non-volatile memory such as a flash memory and volatile storage, such as RAM. In an embodiment, this non-volatile memory may be implemented as a non-transitory storage medium that can store instructions and data. Such non-volatile memory may store code and data (e.g., trained parameters) for one or more discriminators, as described herein, and may also store code performing methods including the method of FIG. 4.

Memory system 510 couples via a bus 550 to a digital core 520, which may include one or more cores and/or microcontrollers that act as a main processing unit of the device. As shown, digital core 520 includes a discriminator 525 which may make binary classifications of spectrograms, as described herein. As further shown, digital core 520 may couple to clock generators 530 which may provide one or more phase locked loops or other clock generation circuitry to generate various clocks for use by circuitry of the device.

As further illustrated, device 500 further includes power circuitry 540, which may include one or more voltage regulators. Additional circuitry may optionally be present depending on particular implementation to provide various functionality and interaction with external devices. Such circuitry may include interface circuitry 560 which may provide interface with various off-chip devices, sensor circuitry 570 which may include various on-chip sensors including digital and analog sensors to sense desired signals, such as speech inputs, image inputs or so forth.

In addition as shown in FIG. 5, transceiver circuitry 580 may be provided to enable transmission and receipt of wireless signals, e.g., according to one or more local area wireless communication schemes, such as Zigbee, Bluetooth, Z-Wave, Thread or so forth. Understand while shown with this high level view, many variations and alternatives are possible.

Figure 6:
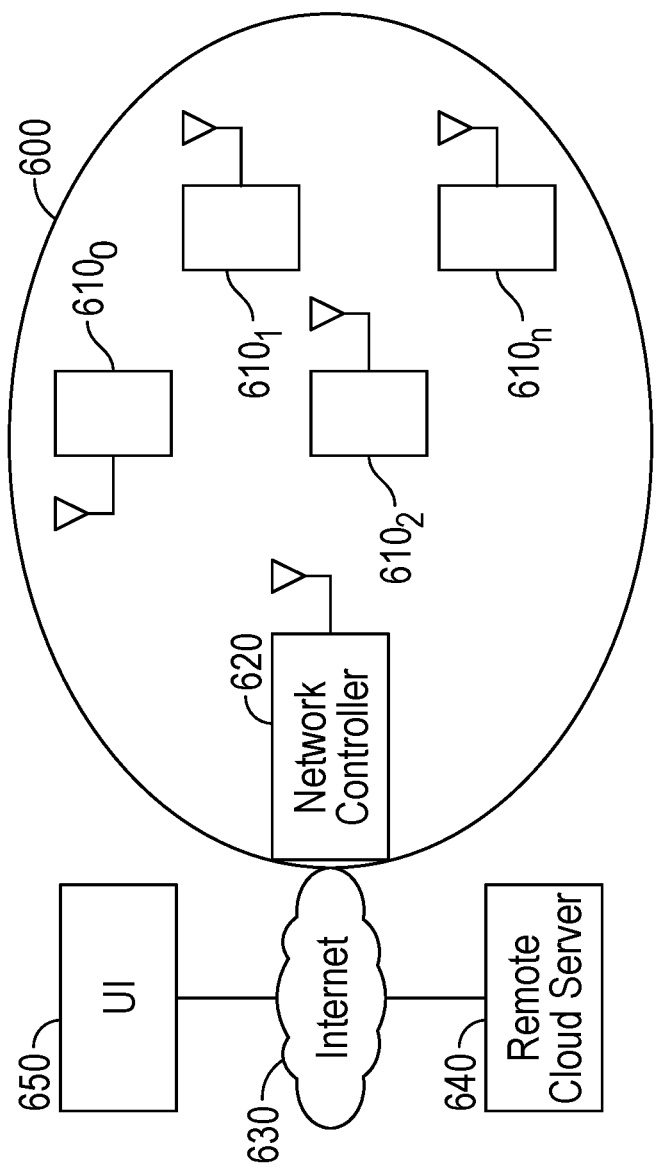
FIG. 6 is a block diagram of a representative wireless automation network in accordance with an embodiment.

Referring now to FIG. 6, shown is a block diagram of a representative wireless automation network in accordance with an embodiment. As shown in FIG. 6, network 600 may be implemented as a mesh network in which various nodes 610 ($610_{0-n}$) communicate with each other and also may communicate messages along from a particular source node to a given destination node. In embodiments herein, one or more nodes 610 may include classifiers trained using a GAN. Such message-based communication also may be realized between various nodes 610 and a network controller 620.

Understand while shown at a very high level in FIG. 6, network 600 may take many forms other than a mesh network. For example, in other cases a star network, a vector-to-vector network or other network topologies may be possible. Furthermore, while generic nodes 610 are shown for ease of illustration, understand that many different types of nodes may be present in a particular application. For example, in the context of a home automation system, nodes 610 may be of many different types. As examples, nodes 610 may include sensors, lighting components, door locks or other actuators, HVAC components, security components, window coverings, and possibly entertainment components, or other interface devices to enable control of such components via network 600. Of course in different implementations additional or different types of nodes may be present.

In addition, different nodes 610 may communicate according to different wireless communication protocols. As examples, representative communication protocols may include Bluetooth, Zigbee, Z-Wave, and Thread, among other possible wireless communication protocols. In some cases, certain nodes may be capable of communicating according to multiple communication protocols, while other nodes only may be capable of communicating by a given one of the protocols. Within network 600, certain nodes 610 may communicate with other nodes of the same communication protocol, either for providing direct message communication or for realizing mesh-based communications with network controller 620 or other components. In other instances, e.g., for certain Bluetooth devices, communications may be directly between a given node 610 and network controller 620.

As such in the embodiment of FIG. 6, network controller 620 may be implemented as a multi-protocol universal gateway. Network controller 620 may be the primary controller within the network and may be configured to perform operations to set up the network and enable communication between different nodes and update such set up as devices enter and leave network 600.

In addition, network controller 620 further may be an interface to interact with remote devices such as cloud-based devices. To this end, network controller 620 further may communicate, e.g., via the Internet with a remote cloud server 640. Remote cloud server 640 may include processors, memory and non-transitory storage media, which may be used to generate and train a discriminator and perform the other operations described herein. As also shown, one or more user interfaces 650 that can be used to interact with network 600 may be located remotely and may communicate with network controller 620 via the Internet 630. As examples, such user interfaces 650 may be implemented within a mobile device such as a smartphone, tablet computer or so forth of a user authorized to access network 600. For example, the user may be a homeowner of a home in which wireless network 600 is implemented as a home automation network. In other cases, the user may be an authorized employee such as an IT individual, a maintenance individual or so forth who uses remote user interface 650 to interact with network 600, e.g., in the context of a building automation network. Understand that many other types of automation networks, such as an industrial automation network, a smart city network, agricultural crop/livestock monitoring network, environmental monitoring network, store shelf label network, asset tracking network, or health monitoring network, among others also may leverage embodiments as described herein.

Figure 7:
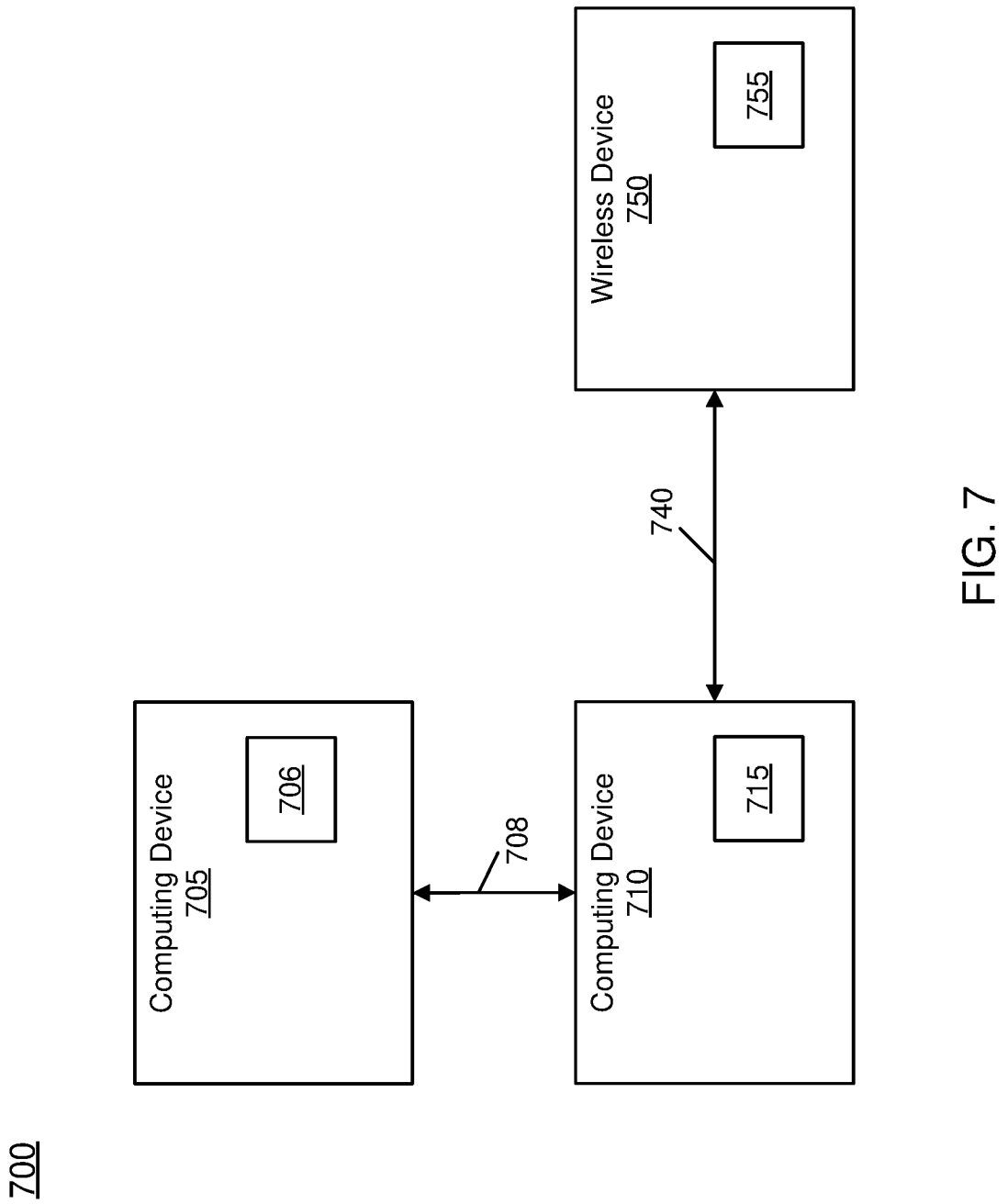
FIG. 7 is a block diagram of a configuration environment in accordance with an embodiment.

Referring now to FIG. 7, shown is a block diagram of a configuration environment in accordance with an embodiment. As shown in FIG. 7, configuration environment 700 includes a plurality of computing devices, including devices 705, 710. Computing devices 705, 710 may be any type of computer systems, and in particular may be cloud-based servers. Understand that a skilled worker such as a chip designer may use computing device 705, which implements a GAN, to create a discriminator network using an embodiment as described herein. This discriminator network may then be provided to computing device 710 which may be of a manufacturing facility, to be used for incorporation of the discriminator network into wireless devices.

Computing devices 705, 710 couple via an interconnect 708 (wired or wireless) and may include various circuitry including one or more processors, communication buses, memory, display and other input/output circuitry, including a user input mechanism such as a touch panel, keypad or so forth and other circuitry. Understand that with embodiments herein, an included memory and/or mass storage device (generally illustrated at items 706, 715) may include instructions stored in a non-transitory storage medium for execution to create a trained discriminator using a GAN.

After the discriminator network is finalized and stored within computing device 710, it may be provided to a wireless device 750 for storage in an included non-volatile memory 755. In different implementations, this discriminator may be provided to wireless device 750 via a wired or wireless interconnect 740. This discriminator can also be updated wirelessly. For example, wireless device 750 can receive an update over the air and the rewrite non-volatile memory 750 with an updated discriminator (e.g., with different weights). In other cases, a discriminator network can be included into image burned into wireless chips at production time or later, with multiple chips being imaged at once in a factory setting. Understand while shown at this high level in the embodiment of FIG. 7, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a sensor to sense real world information;
a digitizer coupled to the sensor to digitize the real world information into digitized information;
a signal processor coupled to the digitizer to process the digitized information into an image;
a discriminator comprising a binary classifier coupled to the signal processor, the discriminator to determine, based at least in part on the image, whether the real world information comprises an anomaly, wherein the discriminator is trained via a generative adversarial network with samples of a positive condition comprising the anomaly, the samples of the anomaly comprising synthetic samples generated by a generator of the generative adversarial network and real samples of the anomaly, wherein the binary classifier is to output a probability value, wherein when the probability value exceeds a threshold the anomaly is detected and when the probability value does not exceed the threshold no anomaly is detected; and
a controller coupled to the discriminator, wherein in response to an indication of the anomaly from the discriminator, the controller is to trigger an action.

2. The apparatus of claim 1, wherein the image comprises a spectrogram.

3. The apparatus of claim 1, wherein the trained discriminator is to determine whether the real world information comprises the positive condition comprising at least one of a glass break sound, a gunshot sound, a baby cry, a falling body, or an emergency siren.

4. The apparatus of claim 3, wherein the generator is to generate the synthetic samples including at least some synthetic glass break sounds or at least some synthetic gunshot sounds.

5. The apparatus of claim 1, further comprising a non-volatile storage comprising a plurality of binary classifiers, each associated with a given anomaly.

6. The apparatus of claim 1, wherein the discriminator is to output a probability metric comprising the indication of the anomaly.

7. The apparatus of claim 6, wherein the controller is to receive the probability metric, and in response to the probability metric exceeding a threshold, the controller is to trigger the action comprising a wireless communication of an alert to a remote location.

8. The apparatus of claim 7, further comprising a wireless circuit to send the wireless communication of the alert to the remote location and receive a command from the remote location, wherein in response to the command the apparatus is to perform the action.

9. The apparatus of claim 1, wherein the real world information comprises audio information and the signal processor is to process the audio information into a spectrogram.

10. The apparatus of claim 1, wherein the generative adversarial network comprises the discriminator and the generator, the apparatus not including the generator.

11. The apparatus of claim 10, wherein the generator and the discriminator are iteratively trained prior to provision of the discriminator to the apparatus.

12. A system comprising:
a sensor to sense real world information;
a digitizer coupled to the sensor to digitize the real world information into digitized information;
a signal processor coupled to the digitizer to process the digitized information into an image;
a discriminator coupled to the signal processor, the discriminator to determine, based at least in part on the image, whether the real world information comprises an anomaly, wherein the discriminator is trained via a generative adversarial network having a generator that provides a plurality of random images to the discriminator, the plurality of random images identified to the discriminator as real images;
an actuator to perform an action; and
a controller coupled to the discriminator, wherein in response to an indication of the anomaly from the discriminator, the controller is to cause the actuator to perform the action.

13. The system of claim 12, wherein the discriminator comprises a binary classifier, the binary classifier to output a probability value, wherein when the probability value exceeds a threshold the anomaly is detected and when the probability value does not exceed the threshold no anomaly is detected.

14. The system of claim 12, further comprising a non-volatile memory to store the discriminator, wherein the system is to receive an updated discriminator for storage in the non-volatile memory as an in-field update.

15. A wireless device comprising:
a sensor to sense real world information;

a digitizer coupled to the sensor to digitize the real world information into digitized information;
a signal processor coupled to the digitizer to process the digitized information into an image;
a discriminator coupled to the signal processor, the discriminator to determine, based at least in part on the image, whether the real world information comprises an anomaly, wherein the discriminator is trained via a generative adversarial network located externally to the wireless device, the wireless device not including the generative adversarial network, the generative adversarial network to provide a plurality of random images to the discriminator, the plurality of random images identified to the discriminator as real images; and
a wireless circuit coupled to the signal processor, wherein the wireless circuit is to communicate information with a remote device.

16. The wireless device of claim 15, wherein the discriminator is to output a probability value, wherein when the probability value exceeds a threshold the anomaly is detected and when the probability value does not exceed the threshold no anomaly is detected.

17. The wireless device of claim 15, wherein the discriminator is trained with samples of a positive condition comprising the anomaly, the samples of the positive condition comprising the anomaly comprising synthetic samples generated by the generative adversarial network and real samples of the anomaly.

* * * * *